United States Patent
Shah et al.

(10) Patent No.: US 8,326,312 B2
(45) Date of Patent: Dec. 4, 2012

(54) SYSTEM AND METHOD FOR IMPROVING CELLULAR TELEPHONE USER EXPERIENCE

(75) Inventors: Jyotindra Shah, Austin, TX (US); Min Lu, Freehold, NJ (US); Stephanie Parlamas, Colts Neck, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 865 days.

(21) Appl. No.: 12/363,924

(22) Filed: Feb. 2, 2009

(65) Prior Publication Data

US 2010/0197286 A1    Aug. 5, 2010

(51) Int. Cl.
*H04W 72/00* (2009.01)

(52) U.S. Cl. ........... 455/452.2; 455/414.1; 455/414.2; 455/414.3; 455/418; 455/419; 455/420; 455/450; 455/452.1; 370/230; 370/231; 370/235; 370/329; 370/341; 370/468; 370/477; 379/114.06; 379/114.07; 379/114.08; 379/114.09; 379/221.06; 379/221.07; 379/265.08; 379/266.01; 379/266.02; 379/266.03; 379/266.06

(58) Field of Classification Search ............. None
See application file for complete search history.

(56) References Cited

U.S. PATENT DOCUMENTS

| | | | |
|---|---|---|---|
| 5,908,467 A | 6/1999 | Barrett et al. | |
| 7,120,424 B1 | 10/2006 | Coan et al. | |
| 7,219,145 B2 | 5/2007 | Chmaytellie et al. | |
| 2003/0114187 A1 | 6/2003 | Jackson | |
| 2004/0048613 A1 | 3/2004 | Sayers et al. | |
| 2004/0120484 A1* | 6/2004 | Buzbee | 379/93.17 |
| 2004/0203821 A1 | 10/2004 | Shively et al. | |
| 2004/0242219 A1 | 12/2004 | Oie et al. | |
| 2005/0037765 A1* | 2/2005 | Rajkotia et al. | 455/450 |
| 2005/0272438 A1 | 12/2005 | Holur et al. | |
| 2006/0003799 A1* | 1/2006 | Dawood et al. | 455/552.1 |
| 2006/0077962 A1* | 4/2006 | Wu et al. | 370/352 |
| 2006/0142013 A1 | 6/2006 | Sayers et al. | |
| 2007/0032975 A1 | 2/2007 | Mori et al. | |
| 2008/0043989 A1* | 2/2008 | Furutono et al. | 379/269 |
| 2008/0049701 A1 | 2/2008 | Bellford et al. | |
| 2008/0147876 A1 | 6/2008 | Campbell et al. | |

* cited by examiner

*Primary Examiner* — Dwayne Bost
*Assistant Examiner* — Yungsang Lau
(74) *Attorney, Agent, or Firm* — Moazzam & Associates, LLC

(57) ABSTRACT

A method for determining an amount of time required to download a data file to a wireless device includes receiving information indicating a first amount of wireless bandwidth allocated for the download of the data file, calculating a first length of time required to download the data file to the wireless device based on the first amount of wireless bandwidth allocated, and comparing the first length of time required to a predetermined amount of time. If the first length of time required is less than the predetermined amount of time, the download begins. If the first length of time required is more than the predetermined amount of time, information indicating the first length of time required is sent to the wireless device, a start download signal is received from the wireless device, and download of the data file to the wireless device begins in response to the start download signal.

9 Claims, 9 Drawing Sheets

SYSTEM AND METHOD FOR IMPROVING CELLULAR TELEPHONE USER EXPERIENCE

FIELD OF THE DISCLOSURE

The present disclosure generally relates to communications networks, and more particularly relates to a system and method for improving cellular telephone user experience.

BACKGROUND

In a wired network, the total amount of bandwidth is usually fixed, predictable, and sufficient to handle an average number of users. A wireless network generally has more limited bandwidth than a wired network. Assuming a similar number of users, most data transactions, from telephone call setup to steaming video, therefore operate at a slower speed in a wireless network than in a wired network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
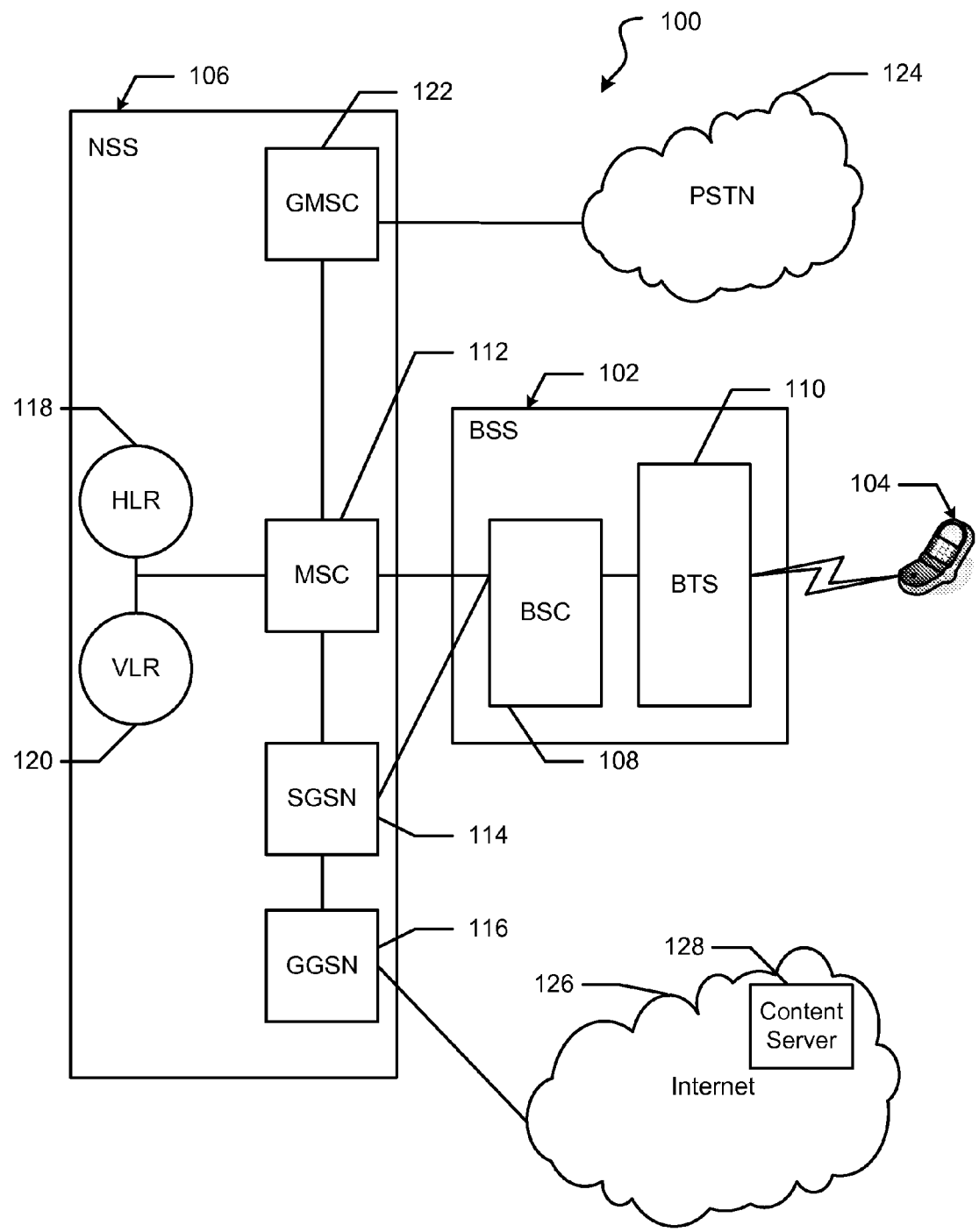
FIG. 1 is a partial block diagram and a partial schematic diagram of a communication network.

FIG. 1 illustrates a telecommunication system 100 including a base station subsystem (BSS) 102, a mobile communications device 104, and a network and switching subsystem (NSS) 106. The BSS 102 may include a base station controller (BSC) 106 and base transceiver station (BTS) 110. The BSS 102 connects to the mobile communications device 104 over a wireless interface, and connects to the NSS. The BSC 108 and the BTS 110 both include processors with associated memory and input/output for carrying out communications functions.

The BSC 108 controls the BTS 110 and may control a plurality of other base transceiver stations in additional to the BTS. The BTS 110 may include radio transmission and reception equipment located at an antenna site. Associated with the BSS 102, a transcoder/rate adaptation unit (TRAU) (not shown) carries out speech encoding and speech decoding and rate adaptation for transmitting data. As a subpart of the BTS 110, the TRAU may be located away from the BTS 110, such as at a mobile switching center located in the NSS 106. When the TRAU is located in this way, the low transmission rate of speech code channels allows more compressed transmission between BTS 110 and the TRAU.

The mobile communications device 104 may include mobile equipment (ME) such as a cellular telephone. The ME does not need to be personally assigned to one subscriber. Some cellular telephones may use a subscriber identity module (SIM) card that contains user account information, as cellular telephones may be automatically programmed by plugging in the SIM card. This allows cellular telephones to be used interchangeably in situations such as renting or borrowing. When a subscriber's SIM is inserted into the mobile communications device 104, all calls for the subscriber are delivered to mobile communications device 104. In addition, cellular telephones may include Short Messaging Service (SMS) that enables text messages to be exchanged.

The NSS 106 may include a mobile switching center (MSC) 120, a Serving GPRS Support Node (SGSN) 114, a Gateway GPRS Support Node (GGSN) 116, a home location register (HLR) 118, a visitor location register (VLR) 120, and a gateway mobile switching center (GMSC) 122. The NSS 106 manages the communication between subscribers, such as a subscriber using mobile communications device 104, and other telecommunications users, such as those using publicly switched telephone network (PSTN) 124. The PSTN 124 may include the worldwide voice telephone network.

The BSC 108 may be coupled to a Serving GPRS Support Node (SGSN) 114 that handles packet data communication to the mobile station 104. The SGSN provides packet routing, including mobility management, authentication and ciphering, to and from a GPRS subscriber on mobile station 104. The SGSN 114 communicates with the Gateway GPRS Support Node (GGSN) 116 to interface to a packet based network, such as Internet 126. The GGSN provides the gateway to the packet based network, handles security and accounting functions, and allocates Internet Protocol (IP) addresses to the mobile station 104.

The MSC 112 coordinates call setup to and from users such as those using mobile communications device 104. The MSC 112 may control several base station controllers such as BSC 108. The GMSC 122 interfaces with external networks for communication with users outside of the wireless system, such as users on PSTN 124.

The HLR 118 may include a stand-alone computer without switching capabilities, a database which contains subscriber information, and information related to the subscriber's current location. The HLR 118 may manage the security data for subscriber authentication. Another sub-division of the HLR 118 may include an equipment identity register (EIR) (not shown) which may store data relating to the ME.

The VLR 120 links to one or more mobile switching centers located on other systems, temporarily storing subscription data of subscribers currently served by the MSC 120. The VLR 120 may hold more detailed data than the HLR 118. For example, the VLR 120 may hold more current subscriber location information than the location information at the HLR 118.

The GMSC 122 interfaces with the PSTN 124. In order to set up a requested call, the call is initially routed to the GMSC 122 that finds the correct home location register by knowing the directory number of the subscriber. The GMSC 122 has an interface with an external network, such as the PSTN 124, for routing communications.

The mobile communications device 104 can access the MSC 112 to set up a telephone call to the PSTN 124, or to set up a data session with the Internet 126, as is well known. While the mobile communications device 104 is connected to the BTS 102, the BSC 108 can determine an allocated amount of wireless bandwidth between the mobile communications device and the BTS 110 to which the handheld device is connected. The BSC 108 can determine the allocated amount of wireless bandwidth based on a size of a communication channel used, a coding technique, a number of users connected to the BTS 110 at a given time, and the like. The communication channel is preferably a radio frequency (RF) band or range, such as 900-925 megahertz (MHz) that the mobile communications device 104 uses to communicate with the BTS 110. Additionally, the communication channel may be divided into different RF channels to allow multiple mobile communications devices 104 to communicate with the BTS 110.

The size of the communication channel and the number of RF channels into which the communication channel is divided can affect the amount of information that can be sent over the communication channel at the same time. For example, if the channel for communication from the mobile communications device 104 to the BTS 110 is 25 MHz and the RF channels are each 200 kilohertz (kHz) wide, then 118 RF channels exist for transmitting information from the mobile communications device to the BTS 110. However, if the channel is 35 MHz then an additional 50 RF channels are available for transmitting information from the mobile communications device 104 to the BTS 110. Thus, the larger the communication channel, the more mobile communications devices 104 that can communicate with the BTS 110.

The coding technique used by the mobile communications device 104 can depend on the wireless network to which the mobile communications device is connected. For example, a Global System for Mobile (GSM) communications network can have four different coding techniques for sending information between the mobile communications device 104 and the BTS 110, and each coding technique has a different rate at which the data is transferred. Additionally, an Enhanced Data Rates for GSM Evolution (EDGE) network can have nine different coding techniques for sending information between the mobile communications device 104 and the BTS 110, and five of the coding techniques can have a higher transfer rate than the GSM coding techniques. Thus, the allocated amount of wireless bandwidth can vary depending on the coding technique used by the mobile communications device 104. The number of users connected to the BTS 110 can also affect the wireless bandwidth available for the mobile communications device 104, since each user takes a particular amount of the allocated amount of wireless bandwidth for communication.

After determining the total amount of wireless bandwidth available, the BSC 108 can send information indicating an estimated amount of allocated wireless bandwidth to each respective mobile communications device. The amount of allocated wireless bandwidth to the mobile communications device 104 can depend on the total amount of wireless bandwidth available, the number of mobile communications devices in an active session with the BTS 110, the amount of wireless bandwidth reserved for additional mobile communications devices, and the like. The mobile communications devices that are in an active session are those devices that have been allocated a specific amount of wireless bandwidth for communication with the BTS 110. Thus, upon the mobile communications device 104 connecting with the BTS 110 in an active session, the mobile communications device is allocated only a portion of the overall wireless bandwidth.

For example, the total amount of wireless bandwidth can be 25 MHz and each channel can be 200 kHz wide. Depending on the number of mobile communications devices connected to the BTS 110 through an active session, and the amount of wireless bandwidth reserved for additional mobile communications devices, the mobile communications device 104 can be allocated 200 kHz and up of the wireless bandwidth.

The BSC 108 can also periodically update the amount of allocated wireless bandwidth for the mobile communications device 104, and can re-send the information indicating the updated amount of allocated wireless bandwidth for the mobile communications device 104. The mobile communications device 104 can then store the indication of contemporaneously allocated amount of wireless bandwidth in memory.

As the mobile communications device 104 initiates communication through the BSS 102 and the NSS 106 to either the PSTN 124 or to the Internet 126, the BSC 108 or the mobile communications device can pass the information about the allocated wireless bandwidth to the MSC 112. The MSC 112 can determine whether the mobile communications device 104 is requesting to set up a telephone call to the PSTN 124 or to initiate a data session with the Internet 126. The data session request may be a request to download a data file from a content server 128, to access a webpage, to send an electronic mail message, and the like. The content server may be hosted by a Telecommunications Service Provider, Application Service Provider, or a Content Hosting Provider.

The MSC 112 can also determine a capability of the MSC to handle the request from the mobile communications device 104. Additionally, the MSC 112 can receive information indicating a capability of the content server 128 to handle the data session initiated by the mobile communications device 104. The capability of the MSC 112 can depend on the number of telephone call setups, and the number of connections to the Internet 126 being performed by the MSC. The capability of the content server 128 can depend on the number users accessing the content server at a particular time. For example, the content server 128 can be transmitting multiple data files through the Internet 126 to a number of different users.

Each user accessing the content server 128 can reduce the capability of the content server to handle a data file download by the mobile communications device 104. Thus, the MSC 112 can determine whether the mobile communications device is requesting to set up a telephone call with the PSTN 124 or to initiate a data session over the Internet 126, and can combine that information with the capabilities of the MSC and of the content server 128 to determine the specific amount of time required to complete the telephone call setup or the data session.

Figure 2:
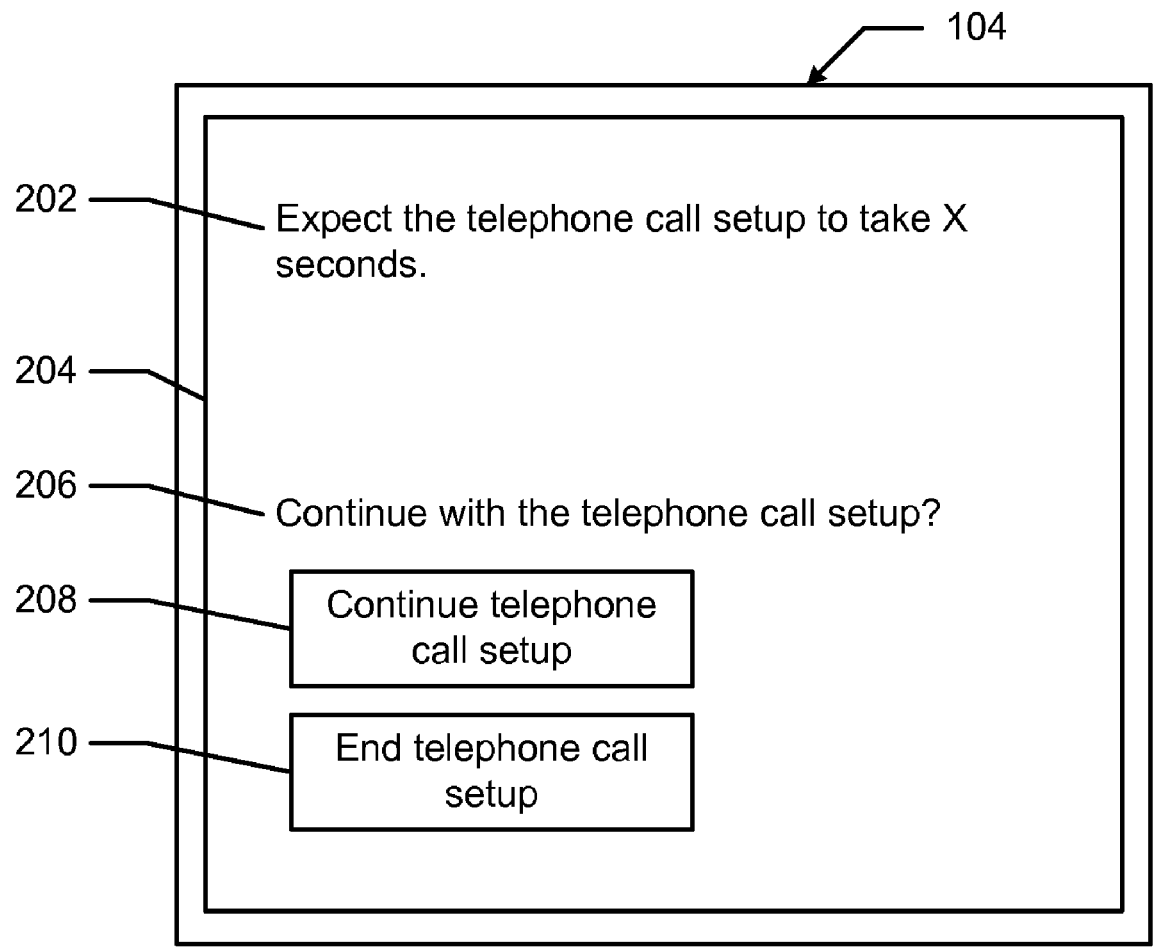
FIG. 2 is a block diagram of a graphical user interface associated with a wireless device operable within a wireless network portion of the communication network of FIG. 1.

If the user is requesting a telephone call setup, the MSC 112 can send information indicating the specific amount of time required to complete the telephone call setup to the mobile communications device 104. Upon receiving the information indicating the specific amount of time required, the mobile communications device 104 can display a representation of the amount of time required as a call setup time text string 202 on a display device 204 of the mobile communications device as shown in FIG. 2. Along with the call setup time text string 202, the mobile communications device 104 can also display a continuation text string 206, a continue telephone call setup button 208, and an end telephone call setup button 210 on the display device 204.

The user can then select whether he or she would like to continue with the call setup by selecting either the continue telephone call setup button 208 or the end telephone call setup button 210 in response to the continuation text string 206. If the user selects the continue telephone call setup button 208, the telephone call setup can continue as a communication between the mobile communications device 104 and the PSTN 124 is established by the MSC 112. If the user decides not to continue with the telephone call setup, he or she can select the end telephone call setup button 210 and the mobile communications device can end the telephone call setup.

Figure 3:
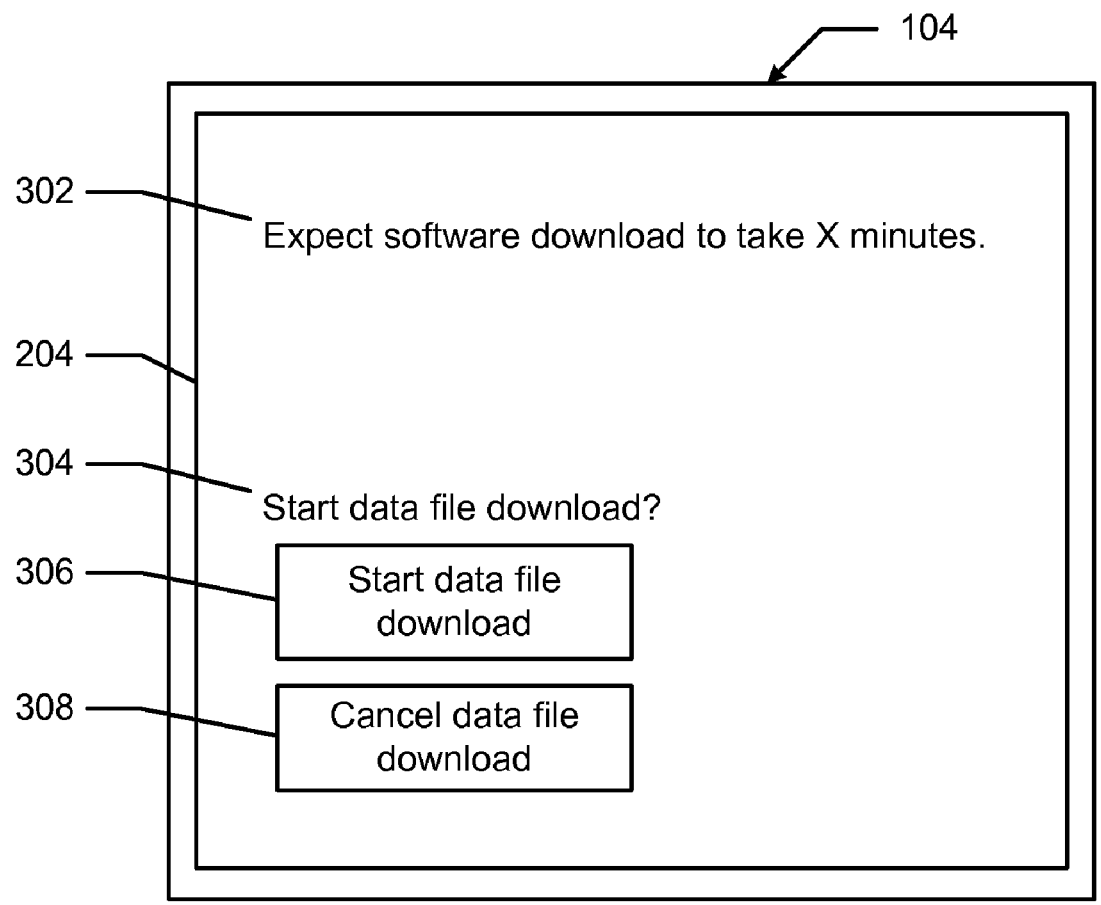
FIG. 3 is a block diagram of an alternative graphical user interface associated with the wireless device.

If the user wants to initiate a data session, such as to download a data file to the mobile communications device 104, the MSC 112 can use the information stated above to determine the amount of time required to download the data file from the content server 128. The MSC 112 can then send information indicating the amount of time required to download the data file to the mobile communications device 104. Upon receiving the information indicating the amount of time required to download the data file, the mobile communications device 104 can output a representation of the amount of time required as a download time text string 302 on the display device 204 as shown in FIG. 3.

The user can then decide whether to continue with the file download based on the amount of time required as indicated in the download time text string 302. A start download text string 304, a start data file download button 306, and a cancel data file download button 308 can be presented on the display device 204 asking if the user would like to start downloading the data file. If the user selects the cancel data file download button 308, the mobile communications device 104 can end the communication with the wired network 104. However, if the user selects the start data file download button 306, the mobile communications device 104 can begin downloading the data file from the content server 128.

While the mobile communications device 104 is downloading the data file, the BSC 108 can continue to determine an updated amount of allocated wireless bandwidth for the mobile communications device 104, and can send the information indicating the updated amount of allocated wireless bandwidth to the mobile communications device. The mobile communications device 104 can then send the information indicating the updated amount of allocated wireless bandwidth to the MSC 112 at periodic intervals, so that the MSC can recalculate the amount of time required to complete the download of the data file. It should be appreciated that available wireless bandwidth can change as the communications device 104 moves with respect to the BSC 108, due to sporadic obstacles between the communications device 104 and BSC or other conditions. Also as other communication devices finish their sessions, BSC 108 may be able to allocate newly available wireless bandwidth to other active communication devices.

Figure 4:
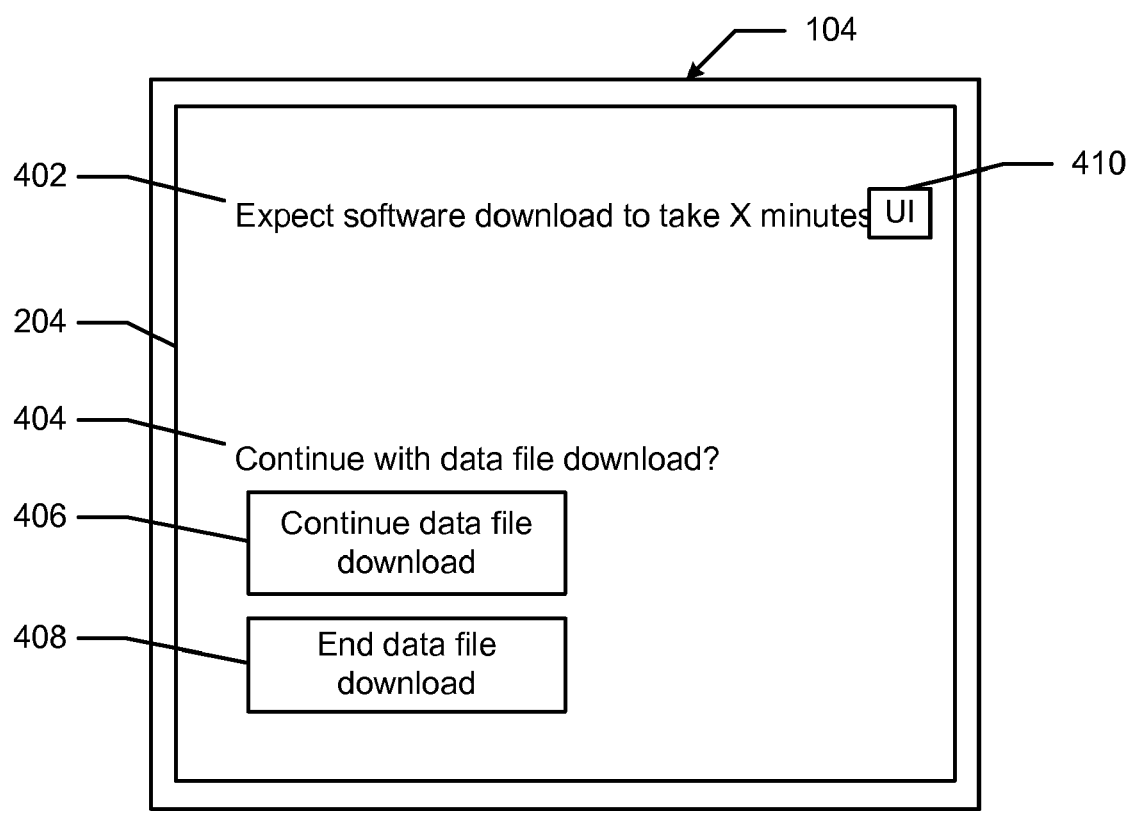
FIG. 4 is a block diagram of another alternative graphical user interface associated with the wireless device.

Upon the MSC 112 recalculating the amount of time required, the MSC can send the information indicating the amount of time to the mobile communications device 104 so that a representation of the amount of time can be displayed as a remaining time text string 402 as shown in FIG. 4. A continue download text string 404, a continue data file download button 406, and an end data file download button 408 can be presented on the display device 204 asking if the user would like to continue downloading the data file. If the user selects the end data file download button 408, the mobile communications device 104 can end the data file download from the content server 128. However, if the user selects the continue data file download button 406, the mobile communications device 104 can continue downloading the data file from the content server 128.

Additionally, the user can manage a user profile that sets criteria such as the type or length of a potential session. For example, the user can specify that he only wants to be prompted to end a telephone call setup or a data file download if the length of time required is more than fifteen seconds. Thus, if the length of time required is less than fifteen seconds, then the mobile communications device 104 can complete either the telephone call setup or the data file download without providing the user with the option to end the process. If the user is provided with the option to end the telephone call setup or the data file download, a user interface icon 410 can be provided on the display device 204, such as adjacent the remaining time text string 402.

Alternatively, the MSC 112 can store in memory a threshold length of time to complete the telephone call setup or the data file download. If the calculated length of time required is less than the threshold, the MSC 112 preferably completes the telephone call setup or the data file download without sending the information indicating the length of time required to the mobile communications device 104. For example, if the length of time required is less than a threshold of fifteen seconds, the MSC 112 can complete the telephone call setup and/or the data file download without sending the information indicating the length of time required to the mobile communications device 104. However, if the length of time required is more than fifteen seconds, the MSC 112 can send the information indicating the length of time required to the mobile communications device 104.

Thus, based on the information associated with the amount of allocated wireless bandwidth for the mobile communications device 104 and the other factors discussed above, the MSC 112 can send information indicating an estimated amount of time required to complete the telephone call setup or to download the data file. Based on the amount of time required, the user can decide whether to continue with the communication or to end the communication between the mobile communications device 104 and the network 100. It should be understood that the mobile communications device 104 can also receive information indicating the required amount of time to send an electronic mail message, access a webpage, send a short message service text message, and the like. The user of the mobile communications device 104 can have the option of completing the transfer of the electronic mail message, the access of the webpage, and/or the transfer of the text message based on the required amount of time. While the telephone call setup has been described between the mobile communications device and a PSTN device, it should be understood that the telephone call setup can also be performed between the mobile communications device and a wireless device. Additionally, it should also be understood that the mobile communications device 104 can be a multimedia device, a personal computer, and/or any other wireless device, such as PDA, Smart Phone or any handhold device, capable of downloading data files and placing telephone calls.

Figure 5:
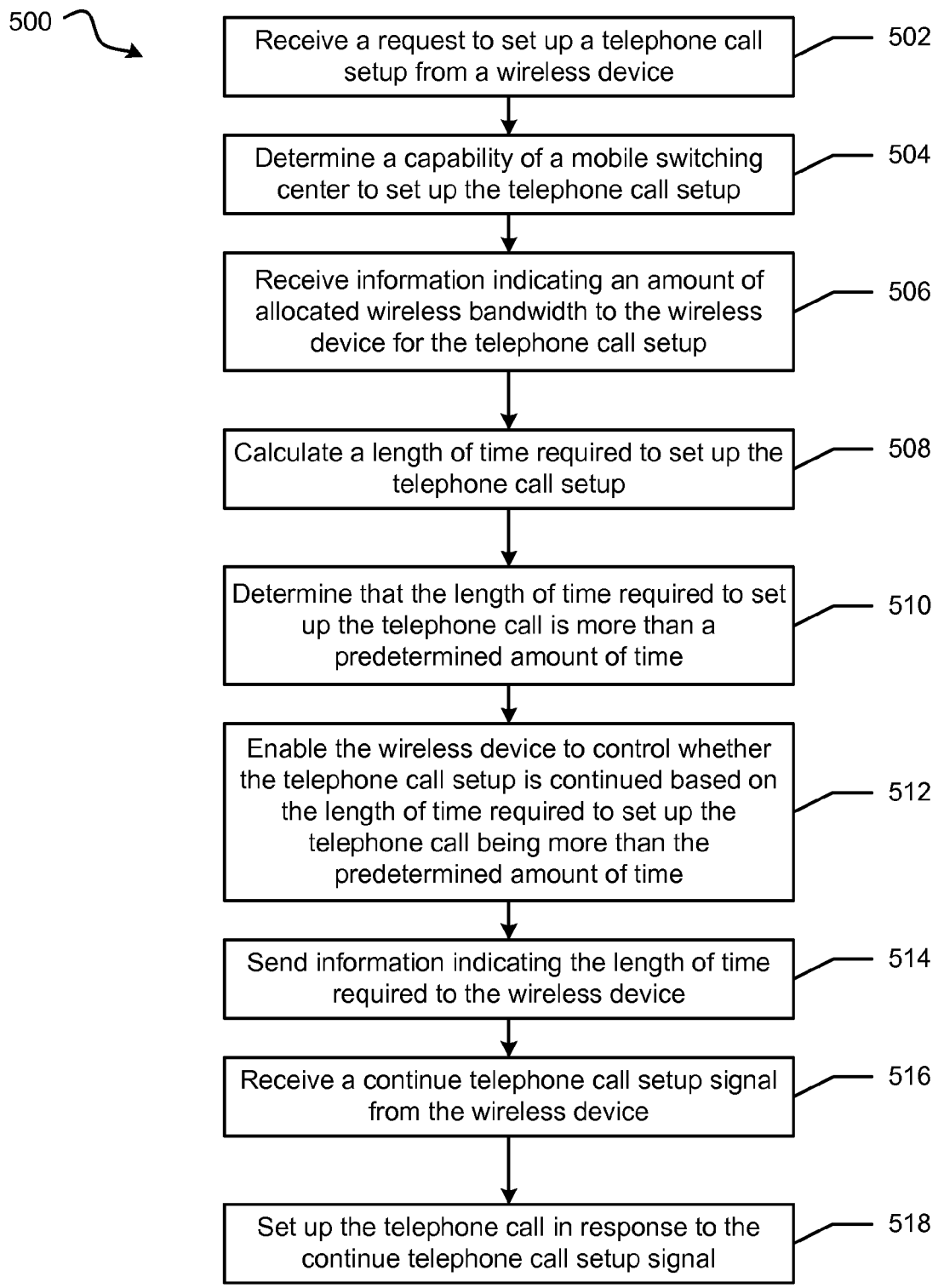
FIG. 5 is a flow diagram of a method for determining an amount of time required to complete a telephone call setup over the wireless network.

FIG. 5 shows a method 500 for determining an amount of time required to set up a telephone call. At block 502, a request to set up a telephone call is received from a wireless device. At block 504, a capability of an MSC to set up the telephone call is determined. Information indicating an amount of wireless bandwidth allocated to the wireless device for the telephone call setup is received at block 506. At block 508, a length of time required to set up the telephone call is calculated. The length of time can be calculated based on the capability of the MSC and on the amount of allocated wireless bandwidth.

At block 510, it is determined that the length of time required to set up the telephone call is more than a predetermined amount of time. The wireless device is enabled to control whether the telephone call setup is continued based on the length of time required to set up the telephone call being more than the predetermined amount of time at block 512. At block 514, information indicating the length of time required is sent to the wireless device. A continue telephone call setup signal is received from the wireless device at block 516. At block 518, the telephone call is set up in response to the continue telephone call setup signal.

Figure 6:
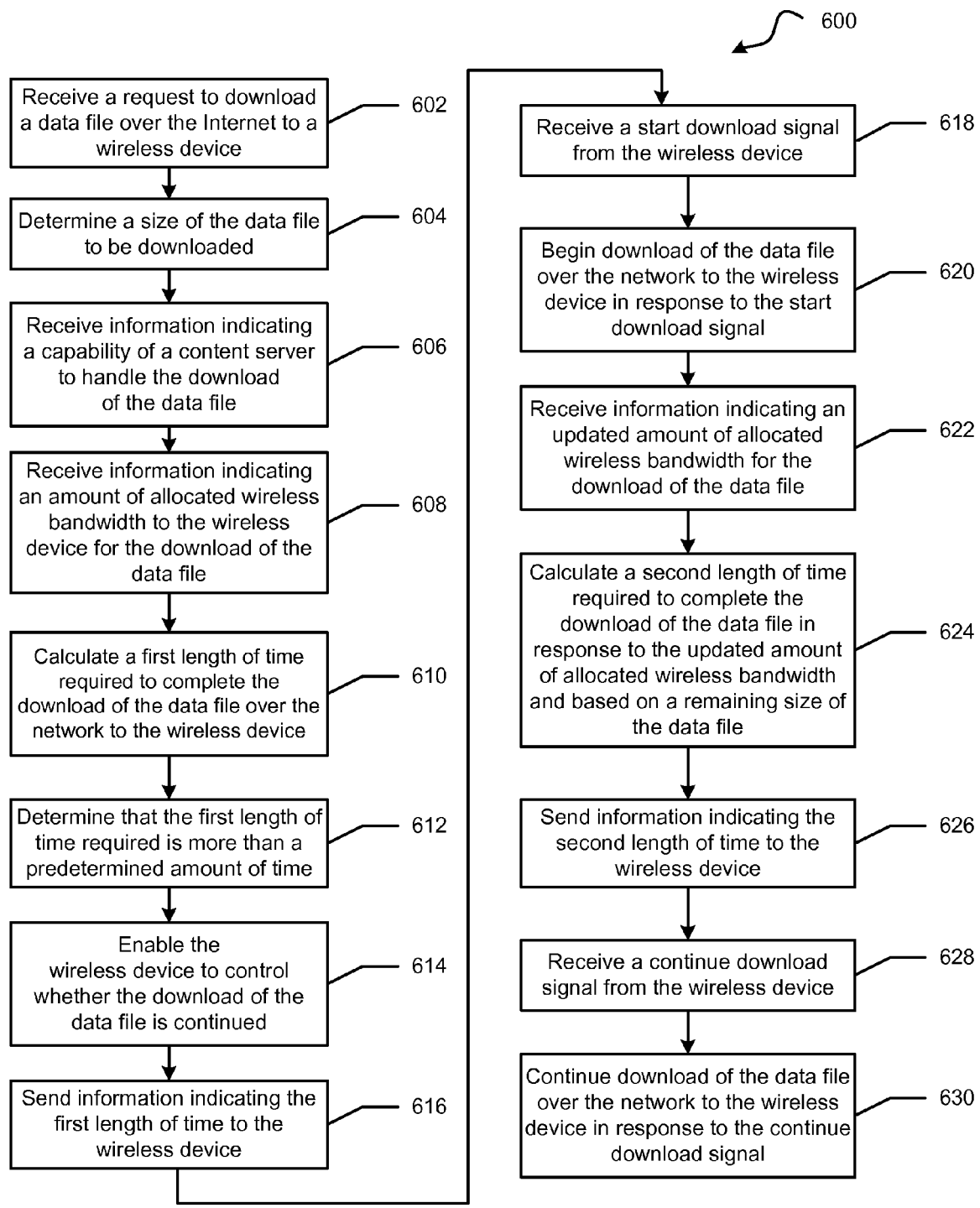
FIG. 6 is a flow diagram of a method for determining an amount of time required to download a data file over the wireless network.

FIG. 6 shows a method 600 for determining an amount of time required to download a data file to a wireless device. At block 602, a request to download a data file over the Internet to a wireless device is received. A size of the data file to be downloaded is determined at block 604. Information indicating a capability of a content server to handle the download of the data file is received at block 606. Information indicating an amount of wireless bandwidth allocated to the wireless device for the download of the data file is received at block 608. At block 610, a first length of time required to complete the download of the data file over the network to the wireless device is calculated. The first length of time required can be calculated based on the size of the data file, on the capability of the content server, and on the amount of allocated wireless bandwidth. At block 612, it is determined that the first length of time required is more than a predetermined amount of time. The wireless device is enabled to control whether the download of the data file is continued based on the first length of time required being more than the predetermined amount of time at block 614. At block 616, information indicating the first length of time required is sent to the wireless device.

At block 618, a start download signal is received from the wireless device. The download of the data file over the network to the wireless device is begun in response to the start download signal at block 620. At block 622, information indicating the amount of allocated wireless bandwidth for the download of the data file is received. A second length of time required to complete the download of the data file in response to the amount of allocated wireless bandwidth and based on a remaining size of the data file is determined at block 624. At block 626, information indicating the second length of time is sent to the wireless device. A continue download signal is received from the wireless device at block 628. At block 630, the download of the data file over the network to the wireless device is continued in response to the continue download signal.

Figure 7:
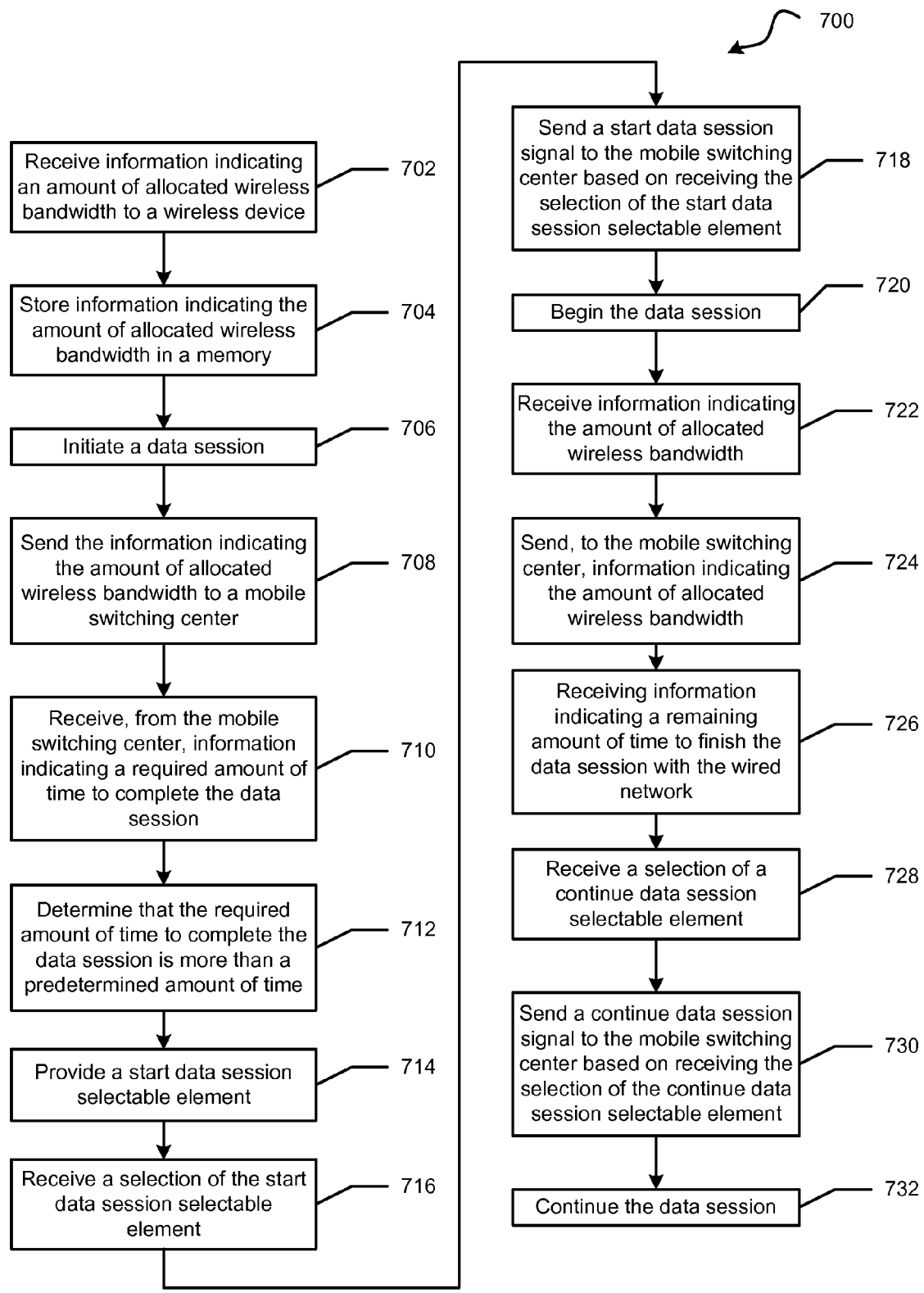
FIG. 7 is a flow diagram of a method for receiving the data file over the wireless network based on an amount of allocated wireless bandwidth.

FIG. 7 shows a method 700 for initiating a data session based on an amount of allocated wireless bandwidth. At block 702, information indicating an amount of wireless bandwidth allocated to a wireless device is received. The information indicating amount of allocated wireless bandwidth is stored in a memory at block 704. At block 706, a data session is initiated. The data session could be to download a data file, to access a webpage, to send an electronic mail message, and the like. The information indicating amount of allocated wireless bandwidth is sent to a mobile switching center at block 708.

At block 710, information indicating a required amount of time to complete the data session is received from the mobile switching center. It is determined that the required amount of time to complete the data session is more than a predetermined amount of time at block 712. At block 714, a start data session selectable element is provided based on the required amount of time to complete the data session being more than the predetermined amount of time. The start data session selectable element can be provided on a graphical user interface of the wireless device. A selection of a start data session selectable element is received at block 716. At block 718, a start data session signal is sent to the mobile switching center based on receiving the selection of the start data session selectable element.

At block 720, the data session is begun. The information indicating an updated amount of allocated wireless bandwidth is received at block 722. The information indicating the updated amount of allocated wireless bandwidth is sent to the mobile switching center at block 724. At block 726, information indicating a remaining amount of time to finish the data session is received. A selection of a continue data session selectable element is received at block 728. At block 730, a continue data session signal is sent to the mobile switching center based on receiving the selection of the continue data session selectable element. At block 732, the data session is continued.

Figure 8:
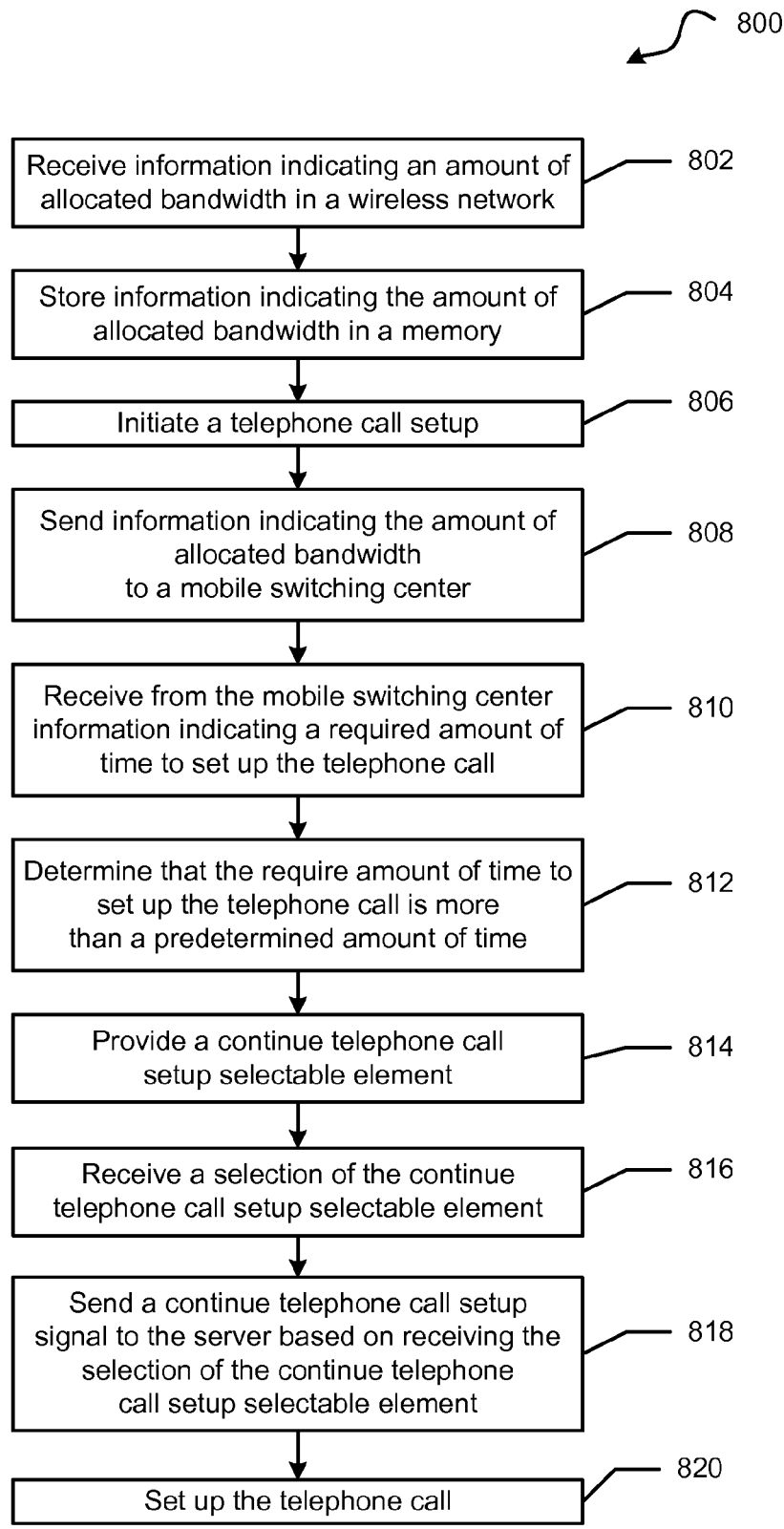
FIG. 8 is a flow diagram of a method for performing the telephone call setup over the wireless network.

FIG. 8 shows a method 800 for setting up a telephone call based on an amount of allocated bandwidth in a wireless network. At block 802, information indicating an amount of bandwidth allocated is received. The information indicating the amount of allocated bandwidth is stored in a memory at block 804. At block 806, a telephone call setup is initiated. The information indicating the amount of allocated bandwidth is sent to a mobile switching center at block 808. At block 810, information indicating a required amount of time to set up the telephone call is received from the mobile switching center.

It is determined that the required amount of time to set up the telephone call is more than a predetermined amount of time at block 812. At block 814, a continue telephone call setup selectable element is provided based on the required amount of time to complete the telephone call setup being more than the predetermined amount of time. The continue telephone call setup selectable element can be provided on a graphical user interface of the wireless device. A selection of a continue telephone call setup selectable element is received at block 816. At block 818, a continue telephone call setup signal is sent to the mobile switching center based on receiving the selection of the continue telephone call setup selectable element. The telephone call is set up at block 820.

Figure 9:
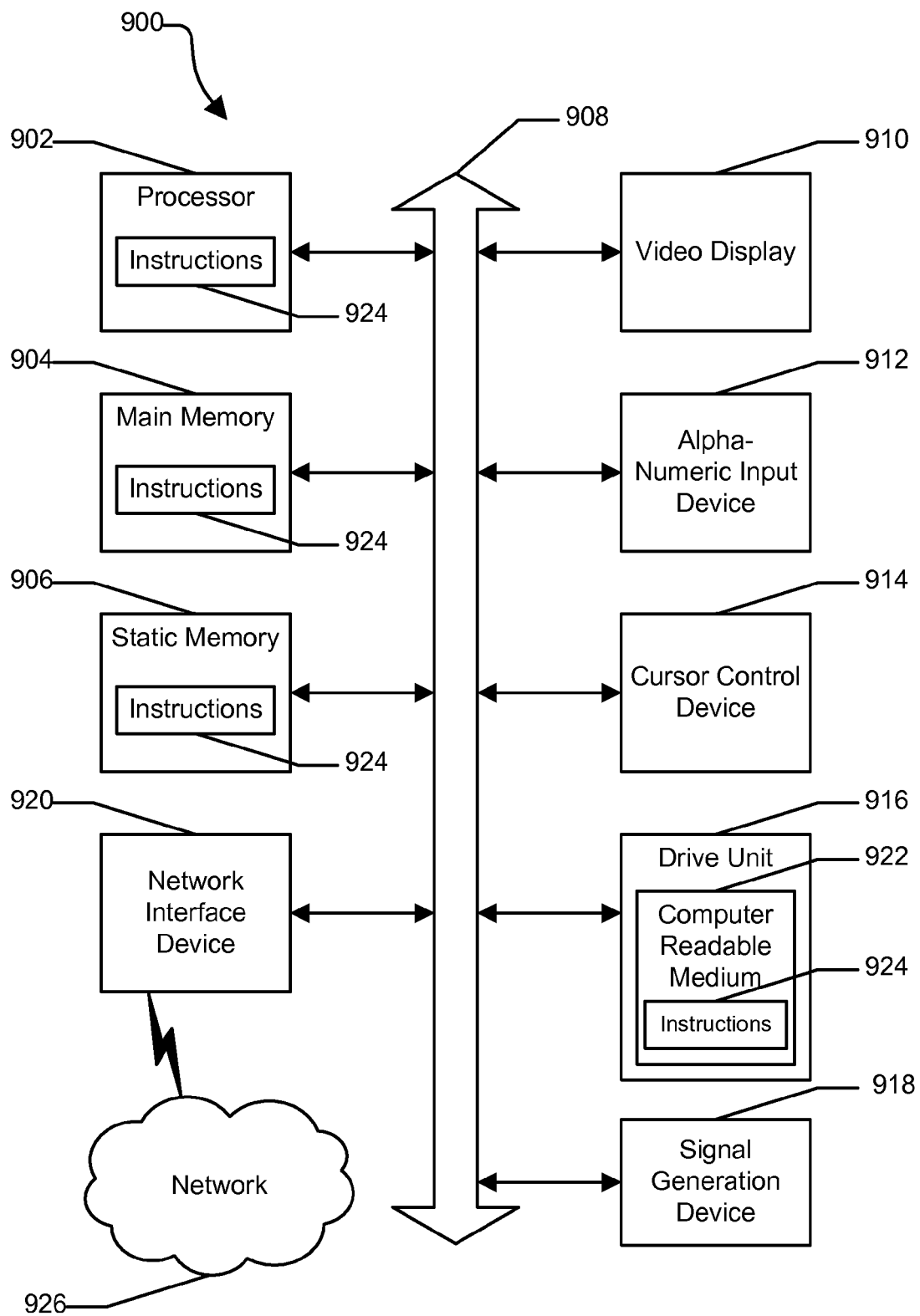
FIG. 9 is a block diagram of a general computer system.

FIG. 9 shows an illustrative embodiment of a general computer system 900 in accordance with at least one embodiment of the present disclosure. The computer system 900 can include a set of instructions that can be executed to cause the computer system to perform any one or more of the methods or computer based functions disclosed herein. The computer system 900 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, small device that can be tied to a wrist, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

The computer system 900 may include a processor 902 such as a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media. The network interface device 920 can provide connectivity to a network 926 such as a wide area network (WAN), a local area network (LAN) or a wireless network. Device may have a capability to plug in Flash memory, NVRAM, volatile RAM, or any easily insertable memory.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   receiving a request from a wireless device to set up a telephone call;
   receiving information indicating an amount of wireless bandwidth allocated for the telephone call setup;
   calculating a length of time required to set up the telephone call based on the amount of wireless bandwidth allocated;
   sending to the wireless device information indicating the length of time required to set up the telephone call;
   receiving a continue telephone call setup signal from the wireless device; and
   setting up the telephone call in response to the continue telephone call setup signal.

2. The method of claim 1 wherein calculating the length of time required to set up the telephone call further comprises:
   determining a capability of a mobile switching center to set up the telephone call.

3. The method of claim 1 further comprising:
   determining that the length of time required to set up the telephone call is more than a predetermined amount of time; and
   enabling, prior to sending information indicating the length of time required to the wireless device, the wireless device to control whether the telephone call setup is continued based on the length of time required to set up the telephone call being more than the predetermined amount of time.

4. The method of claim 1 wherein the wireless device is selected from a group consisting of a cellular telephone, and a portable multimedia device.

5. The method of claim 1 wherein the telephone call is to a public switched telephone network.

6. A device comprising:
   a memory; and
   a processor in communication with the memory, the processor configured to:
     receive information indicating an amount of wireless bandwidth allocated to the device;
     store the information indicating the allocated bandwidth in the memory;
     send the information indicating the allocated bandwidth to a mobile switching center;
     receive, from the mobile switching center, information indicating an estimated amount of time to set up a telephone call;
     receive an indication to continue the telephone call setup; and
     send a continue telephone call setup signal to the mobile switching center based on the indication.

7. The device of claim 6 wherein the processor is further configured to:
   compare the estimated amount of time to set up the telephone call with a predetermined amount of time; and
   prior to receiving the indication, provide the continue telephone call setup signal if the estimated amount of time is more than the predetermined amount of time.

8. The device of claim 6 wherein the indication is received from a graphical user interface.

9. The device of claim 6 wherein the telephone call setup is to a public switched telephone network.

* * * * *